March 7, 1933.    R. N. KIRCHER    1,900,565
COOKING UTENSIL HANDLE
Filed Jan. 25, 1930

INVENTOR.
Ralph N. Kircher
BY
ATTORNEY.

Patented Mar. 7, 1933

1,900,565

UNITED STATES PATENT OFFICE

RALPH N. KIRCHER, OF WEST BEND, WISCONSIN, ASSIGNOR TO WEST BEND ALUMINUM COMPANY, OF WEST BEND, WISCONSIN, A CORPORATION OF WISCONSIN

COOKING UTENSIL HANDLE

Application filed January 25, 1930. Serial No. 423,354.

My invention relates to an improvement in the construction of the means employed for attaching radial handles to cooking utensils, of which a frying pan has been selected as an illustration.

The object of the invention is to construct a wooden handle and attach it to the utensil in such manner that the connection between the two will be a permanent one, and not be subject to the usual charring of the handle which follows the radiation of heat through the metal connections through which the handle is attached to the utensil.

A further object of the invention is to so connect the handle to the utensil that relative rotation of the utensil and the handle will be prevented.

It is highly desirable that wooden handles be used for utensils of this class, inasmuch as the insulating properties possessed by wooden handles enables the utensil to be shifted by hand without discomfort. In structures of this kind heretofore used, the handle becomes loose with the charring of the wooden parts in contact with the metal, and the stable character of the connection of the handle with the utensil is destroyed. And when the handle becomes loose, the rigidity of the connection is destroyed, and it is difficult to prevent the utensil from turning in the handle and spilling its contents.

My invention has been especially designed with a view to overcoming the objections inhering to the former structure. In securing these results, I provide a plate for attachment to the outer side of the utensil, and provide such plate with an outward extension arranged radially with respect to the utensil and formed at its end with a socket in which is entered the inner end of the wooden handle. A shaft is secured at one end centrally of the socketed extension, and the wooden handle is bored to receive the projecting portion of the said shaft. A cap is applied to the outer end of the cap handle, and is retained in position by a screw passing through a perforation in the said cap and having a threaded end which enters a threaded bore in the outer end of the shaft. The screw acts with a clamping effect to hold the parts in a position of assembly.

In order to overcome the tendency of the vessel to rotate with respect to the handle in the event that the connection between the handle and the vessel becomes loose from any cause, I make the shaft of polygonal cross section, and form in the wooden handle a bore of like cross sectional contour, so that relative rotation of the parts is restrained at all times in the use of the cooking utensil.

Having thus outlined the nature and purposes of my invention, I will now proceed to describe the same specifically, and will point out the novelty thereof in the appended claim.

Figure 1:
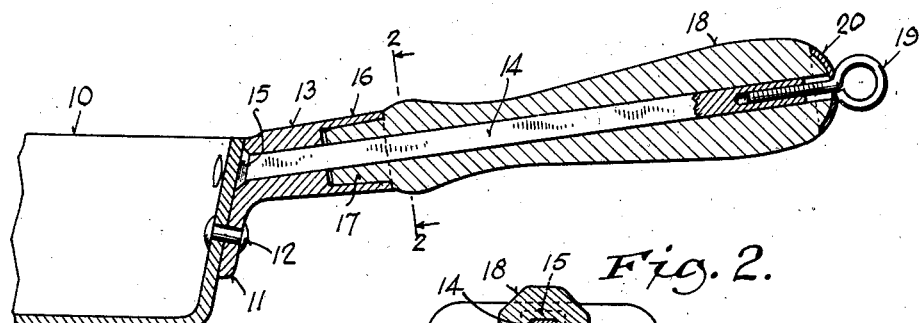
Figure 1 is a vertical sectional view through a portion of a frying pan and a handle applied thereto in accordance with my invention.

In the drawing, the numeral 10 indicates a cooking utensil, that shown being in the form of a frying pan. A plate 11, shown as triangular, but which may be of any desired contour, is attached to the wall of the pan at one side by rivets 12, passed through perforations in the plate 11 and wall of the pan. The plate 11 is provided with a radial extension 13, which is bored centrally and has a socket at its outer end. The bore in the extension 13 is squared, to receive the inner end of a squared shaft 14, and the said bore is enlarged at the end adjacent the wall of the pan, so as to provide a flare. The end of the shaft 14 is upset, as at 15, to fill the flared opening and prevent withdrawal of the shaft. Movement in the contrary direction is resisted by the upset end of the shaft abutting the wall of the utensil. The squared shaft fits tightly in the squared opening in the extension 13, and thus the shaft is secured against rotation.

A socket 16 is formed at the outer end of the extension 13, for the entrance therein of the reduced end 17 of a wooden handle 18, the latter being provided with a squared, longitudinal, central perforation, produced by the use of a broaching tool having the dimensions of the squared shaft 14. In this manner, a long bearing between the shaft and the handle is produced, whereby rotation of the shaft in the handle and consequent turning of the frying pan, is prevented. In the construction shown, the outer end of the shaft 14 is provided with a threaded axial bore, which is entered by the threaded end of a screw or bolt 19 passed through the central perforation in a dished metal cap 20. The screw or bolt 19 may be formed as a screw eye, by means of which the frying pan may be suspended when the utensil is not in use.

The heat transmitted from the pan 10 to the extension 13 is quickly radiated, and inasmuch as the contact of the reduced end of the wooden handle with the metal is at some distance from the part of the pan to which the flame is applied, there is little or no liability that the reduced end of the handle will be charred by the heat. But even if there should occur a looseness in the connection which would permit longitudinal movement of the handle, the slack can be taken up, and the connection again made rigid, by turning up the screw or bolt 19.

Figure 2:
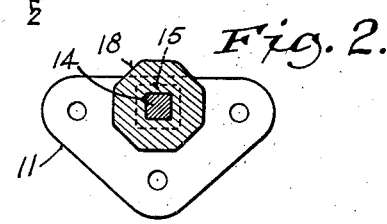
Fig. 2 is a transverse sectional view through the handle and the shaft upon which it is mounted, the view being taken on the line 2—2 of Fig. 1, and showing the plate in elevation.

The anchoring of the squared shaft in the extension 13, insures the retention of the shaft in a fixed position, and the formation of a squared hole in the handle 18 prevents the rotation of the latter, thus enabling the frying pan to be maintained always on a level and without danger of spilling its contents. In Fig. 2 the handle 18 is shown as of polygonal cross section, this being the most desirable form of its embodiment.

Figure 3:
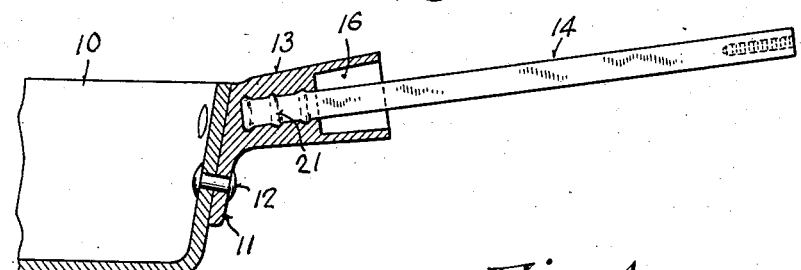
Fig. 3 is a view similar to Fig. 1, showing a modification of the manner of securing the shaft in the socketed extension of the attaching plate.

The construction shown in Fig. 3 differs from that of Fig. 1 only in the manner in which the inner end of the squared shaft is secured in the extension 13 of the plate 11. In the said Fig. 3, the end of the shaft 14 is shown as of irregular diameter, with enlarged ribs 21 formed thereabout. In casting the plate 11 and the extension 13, to produce the structure shown in Fig. 3, the enlarged end of the shaft 21 is placed in the mold, and when the casting metal is poured therein the ribs 21 on the shaft 13 are firmly embedded in the casting, so that the shaft 14 can neither be rotated nor moved longitudinally.

Figure 4:
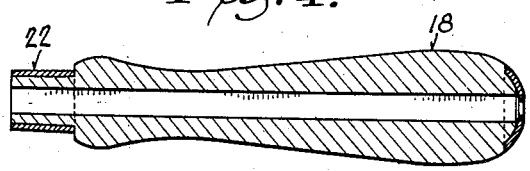
Fig. 4 is a longitudinal vertical section of the handle shown in Fig. 1, detached, the handle being provided with a heat resisting ferrule which is adapted to be entered in the socketed extension of the attaching plate.

In Fig. 4, I have provided the reduced end of the insulating wooden handle 18 with a ferrule 22, which fits tightly, and preferably is of some metal which will retard the radiation of heat. This construction lessens the liability of the reduced end of the handle to become charred at the point of its connection with the frying pan.

Having thus described my invention, what I claim and desire to secure by Letters Patent of the United States, is:

A cooking utensil handle of insulating material provided with a squared bore, combined with means for connecting the handle to the utensil, the said means comprising a plate adapted to be secured upon the utensil and having a radially extending projection provided with a squared longitudinal bore with a flare at its inner end and a socket at its outer end, a squared shaft anchored in the said bore and extending outwardly of the socket, and having its inner end expanded to fill the flare and prevent withdrawal of the shaft, the said handle arranged upon the said shaft and having one end entered in the said socket, and means engaged with the shaft for securing the handle upon the shaft.

In testimony whereof I have signed my name at West Bend, this 31st day of December, 1929.

RALPH N. KIRCHER.